March 9, 1954 J. G. URBANIK 2,671,875

QUADRATURE REJECTION SYSTEM

Filed May 17, 1951 3 Sheets-Sheet 1

INVENTOR
JOHN G. URBANIK
BY
Pennie, Edmonds, Morton, Barrows and Taylor
ATTORNEYS March 9, 1954 J. G. URBANIK 2,671,875

QUADRATURE REJECTION SYSTEM

Filed May 17, 1951 3 Sheets-Sheet 2

INVENTOR
JOHN G. URBANIK
BY
Pennie, Edmonds, Morton, Barrows and Taylor
ATTORNEYS March 9, 1954 J. G. URBANIK 2,671,875

QUADRATURE REJECTION SYSTEM

Filed May 17, 1951 3 Sheets-Sheet 3

INVENTOR
JOHN G. URBANIK
BY
Pennie, Edmonds, Morton, Barrows and Taylor.
ATTORNEYS Patented Mar. 9, 1954 2,671,875

UNITED STATES PATENT OFFICE 2,671,875

QUADRATURE REJECTION SYSTEM

John G. Urbanik, Oceanside, N. Y., assignor to The Perkin-Elmer Corporation, Norwalk, Conn., a corporation of New York Application May 17, 1951, Serial No. 226,861

17 Claims. (Cl. 318—18)

This invention relates to the rejection of undesired time quadrature signal components, and is applicable to various electrical apparatus such as electromechanical computers, especially those employing a servo-loop which includes a resolver.

The increased use of resolvers as elements in electromechanical computers, and the like, has made more evident certain errors or deflects in operation resulting from the capacitive coupling inherent between the rotor and stator coils of the resolver. In view of the inductive and capacitive couplings between the coils, not only the desired signal voltage, but also an undesired quadrature component thereof, appears at the output terminals of the rotor. The resulting errors or defects in operation are usually due to one or both of the following causes: (a) When cascaded servo-loops are employed the quadrature effect is cumulative and the vacuum tube amplifier, customarily included in the loop, approaches saturation which reduces the gain of the servo-loop and can effectively paralyze the system. (b) Inasmuch as the magnitude of the quadrature component varies as a function of the rotor orientation of the resolver, the accuracy of the servo-loop is decreased, even in the absence of amplifier saturation. This effect is especially noticeable in the event that the phase shift introduced by the amplifier is appreciable.

Although improved design has decreased the degree of the undesired capacitive coupling in the resolver, that portion which remains nevertheless permits an undesirable quadrature voltage component to appear at the output of the resolver. It is, therefore, the object of this invention to eliminate or to nullify this quadrature voltage component at the point where it appears, such as the output of the resolver, or elsewhere in the system prior to a point where its presence would introduce an error or faulty operation.

Briefly, the invention contemplates rejecting or cancelling the undesired quadrature voltage component by establishing a correction voltage which is of equal amplitude and opposite phase with respect to the quadrature component, and introducing this correction voltage at the input of the amplifier, or other point which follows the source of the quadrature voltage in the system. The nature of the apparatus and the method by which the cancellation is effected will be understood by reference to the following description considered in connection with the accompanying drawings, wherein.

Electrical resolvers, as herein contemplated, are well known in the art and are usually employed to transform an electrical quantity into a physical quantity, such as a certain degree of angular rotation. They are useful, for example, in connection with the solution of problems relating to addition, composition or resolution of vectors, the addition of angles, the solution of various trigonometric problems, the rotation of coordinates and transfers between polar and rectangular coordinates. Fundamentally a resolver comprises a rotor and a stator, each comprising two independent windings of which the axes are 90° apart, and hence may be regarded as a signal transformer having a continuously variable ratio.

Figures 1, 2:
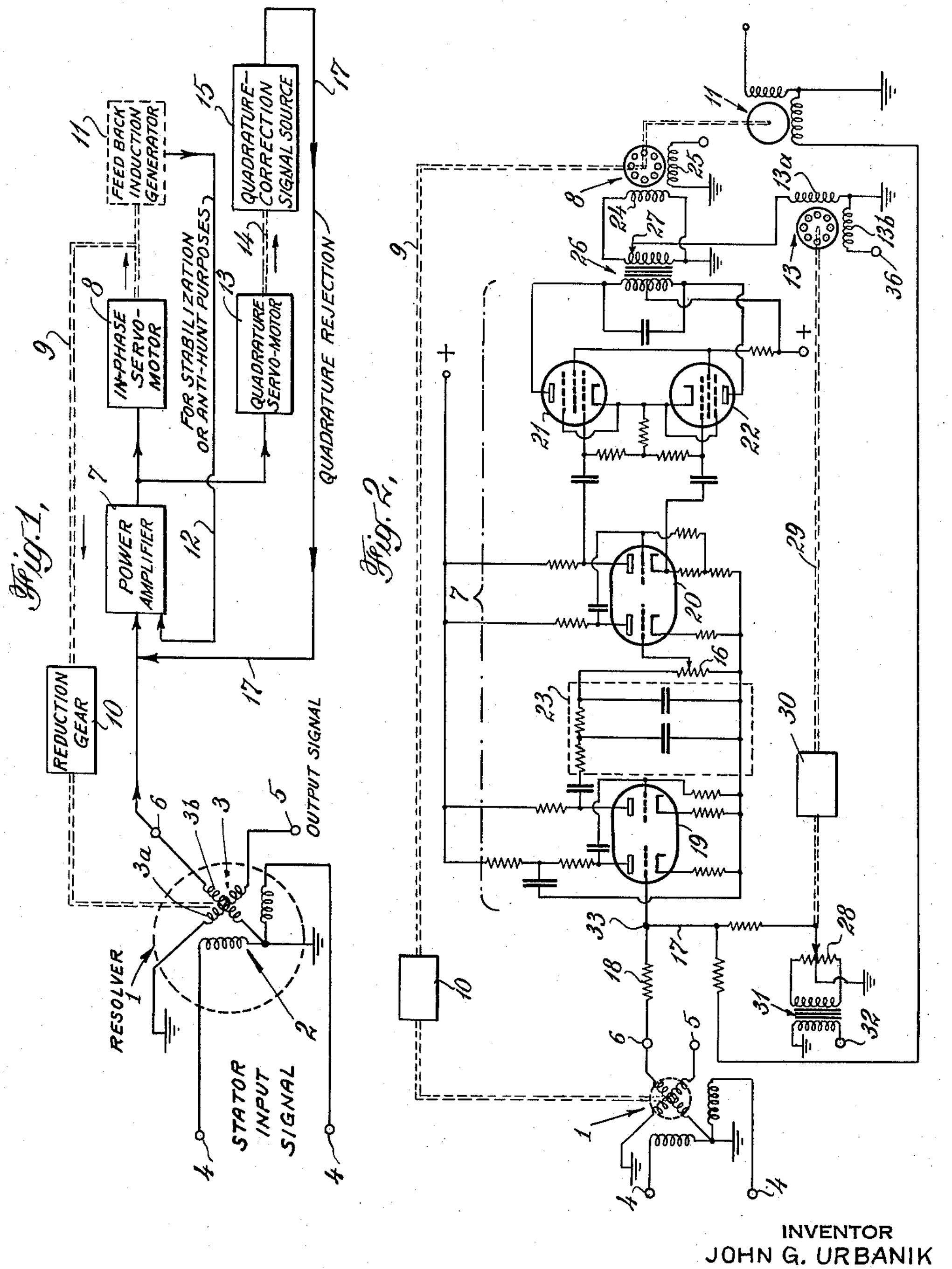
Fig. 1 illustrates the invention in block diagram form.
Fig. 2 is a circuit diagram of a preferred embodiment of the invention, such as illustrated in Fig. 1.

Referring now to the block diagram of Fig. 1, the resolver 1 comprises fundamentally a stator 2 and a rotor 3. The desired input signals to the stator are assumed to be connected to the input terminals 4. For purposes of illustration it may be assumed that the "input signals" comprise two components of a 400 cycle, modulated carrier signal.

Of the two rotor windings 3a and 3b, one each is grounded as shown in Fig. 1, and one each is connected to an output terminal, 5 and 6, respectively. Output terminal 5 is shown unconnected, because the output signal voltage appearing there may be employed for any desired purpose as is well understood in the art, it having no immediate connection with the present invention. At terminal 6 appears a desired output signal which actuates a servo-motor, and at this terminal also appears the error signal comprising the quadrature voltage component which is rejected or cancelled in accordance with the present invention. Terminal 6 is connected, as shown, to the input of power amplifier 7. Thus, in the absence of the invention, both the desired and undesired signals are impressed on the power amplifier. As is customary, the output of the power amplifier is coupled to an in-phase servo-motor 8 which is here assumed to be of the two-phase type and hence will tend to rotate in response to that part of the signal voltage between terminal 6 and ground which is correctly phased at the motor. For convenience, the in-phase signal may be designated $\phi_1$.

The mechanical output of in-phase servo-motor 8 is linked through shaft 9 to rotor 3 of the resolver. Usually a reduction gear 10 is inserted in this mechanical link. The electro-mechanical path, just described, extending from rotor winding 3b through terminal 6, power amplifier 7, in-phase servo-motor 8, and returning through mechanical link 9, 10 to the rotor 3 is known as a servo-loop.

The feedback induction generator 11 which is mechanically coupled to in-phase servo-motor 8 so as to be driven thereby, generates a voltage which is connected back through feedback line 12 to the input of amplifier 7. The purpose of this feedback is to stabilize the servo-loop for anti-hunt purposes.

To achieve the object of the invention, a quadrature-rejection loop is employed so as to reject or cancel the quadrature component $\phi_2$ of the in-phase signal $\phi_1$. The quadrature rejection loop includes means for generating a correction signal of magnitude equal and of phase opposite to that of the quadrature voltage. In Fig. 1 this quadrature rejection loop is shown to include a quadrature servo-motor 13 the input of which is connected to the output of power amplifier 7. This servo-motor 13 is of the two-phase type and as designed and connected constitutes a phase discriminator because it responds only to the quadrature signal $\phi_2$. The shaft of servo-motor 13 is mechanically coupled through link 14 to quadrature potentiometer 15, so that the output voltage of the potentiometer is proportional to the movement of servo-motor 13. The coupling link 14 may include a reduction gear of desired ratio. Quadrature correction signal source 15 produces a correction voltage as above described and may comprise a potentiometer, a generator, or other suitable device. The correction voltage is fed through line 17 to the input of power amplifier 7, and is so connected as to be equal in magnitude and of polarity opposite to that of the instantaneous quadrature component voltage otherwise impressed on the input of amplifier 7.

The system of Fig. 1 including the quadrature rejection loop of the present invention is shown in more detail in Fig. 2 wherein, as in the other figures, like reference characters represent corresponding components.

As before, the input signal impressed on input terminals 4, 4 of resolver 1 may be of any nature required for the purpose for which the servo-loop is employed, but, as an example, is here assumed to be of 400 cycles, modulated by variable quantity so as to convey the desired information. The relative phase of the signal may indicate a direction of motion, if desired.

The signal is fed from terminal 6 through a suitable resistor 18 to the input of a power amplifier 7 which here is shown to include four vacuum tubes 19, 20, 21 and 22. Tubes 19 and 20 may be of any suitable type, such as type 12AU7, 12AX7, or 6J6. Tube 20 is connected to provide phase inversion as well as amplification. The gain can be adjusted by potentiometer 16. The output power amplifier tubes 21, 22 are connected in push-pull relation, as shown, and may be of type 6AQ5 or 5687. Between amplifier tubes 19 and 20 a phase-shift network 23 is included, and this network is proportioned so as to shift by 90° the signal or signals which pass through amplifier 19. Network 23 also serves as a low-pass filter and removes harmonics and many other undesired voltage components.

Coupled to the output of the push-pull stage 21, 22 of amplifier 7 is an in-phase servo-motor 8 having two fixed windings 24 and 25. The output voltage from the power amplifier is impressed on winding 24 as shown; and a reference voltage of phase $\phi_1$ is impressed on winding 25. The power source $\phi_1$ connected to winding 25 may be derived from the same generator which powers the other components of the system. In view of the 90° phase shift effected by network 23, the voltages in windings 24 and 25 will be separated in phase by 90°, which is necessary to operate this two-phase servo-motor. This motor will not respond to the quadrature voltage component, although if that component is not removed from the system as by the present invention it will tend to heat the motor. The servo-loop is completed from in-phase servo-motor 8 through shaft 9 and reduction gear 10 to rotor 3 of the resolver. Reduction gear 10 may be of any required ratio, a value of 750 to 1 being typical of one embodiment.

Coupling transformer 26 serves to connect the outputs of tubes 21 and 22 in push-pull relation and to couple them as a unit to motor winding 24 with proper impedance matching. Since transformer 26 also serves to couple the output of the power amplifier to quadrature phase induction or servo-motor 13, an adjustable tap 27 on the secondary winding is provided to match the impedance of the transformer with that of the motor.

The use of a feedback induction generator 11 is understood in the art and need not be elaborated upon here except to state that the generator is connected so that the output voltage therefrom is in opposition to the desired signal voltage $\phi_1$. This relation tends to stabilize the servo system by damping servo-motor 8.

As shown in Fig. 2, one winding 13a, of quadrature servo-motor 13 is connected to receive amplified signal voltage from transformer 26 via tap 27. It may be assumed for purposes of explanation that the desired signal voltage $\phi_1$ and the undesired quadrature voltage $\phi_2$ are both impressed on winding 13a. However, as above stated in connection with Fig. 1, the second winding 13b of servo-motor 13, which is 90° displaced with respect to winding 13a, is energized from a separate source of voltage which is 90° out of phase with respect to the voltage appearing on winding 25. As a result, servo-motor 13 will be actuated by the quadrature component voltage and not by the signal voltage. Servo-motor 13 thus comprises in effect a phase discriminator.

A statement of the phase relations of the voltages above referred to in connection with Fig. 2, may assist in an understanding of the operation of the system. Assuming that the desired signal impressed on amplifier tube 19 is of phase $\phi_1$ and that the undesired quadrature component is of phase $\phi_2$, then in view of the 90° phase shift through network 23 the corresponding voltages appearing across the secondary winding of transformer 26 will be, respectively, $\phi_1$—90° and $\phi_2$—90°. Consequently, the reference voltage impressed on winding 25 should be $\phi_1$ and the motor 8 will turn only in response to the $\phi_1$—90° component appearing in winding 24. Similarly, the voltages impressed on winding 13a of servo-motor 13 will be $\phi_1$—90° and $\phi_2$—90°; however, since the reference voltage impressed upon winding 13b is $\phi_1$—90°, or equivalently $\phi_2$—180°, then the voltage $\phi_2$—90° will comprise the effective operating voltage on winding 13a. In considering the mentioned phase relations it should be borne in mind that the reference voltages applied to windings 25 and 13b, respectively, are not the voltages impressed by the resolver on the input of the amplifier, although they bear the defined phase relations thereto. These reference voltages are furnished by an independent source. It is usually convenient to take them from separate windings or taps on the same generator which furnishes the power to the resolver or to the circuit elements which precede it in the system; 90° phase relationship between the reference voltages may be derived from a suitable transformer of the Scott type, or by means of suitable phase shift networks.

Quadrature servo-motor 13 is, in the system of Fig. 2, arranged to actuate a quadrature potentiometer 28 through shaft 29 in which a reduction gear 30, of a ratio, for example, of 350 to 1, may be interposed. The potentiometer, when energized and actuated, constitutes the quadrature correction signal source represented in Fig. 1. It is important that this potentiometer be of low resistance and impedance, viz., be free of iron, in order to produce an output voltage of single frequency and single phase. Potentiometer 28 is energized through transformer 31 from a power source connectible to the primary terminal 32. In the present case this power source may be the same $\phi_2$ voltage as impressed upon winding 13b of motor 13. Nominally, 180° phase shifts of either signal or reference voltages are corrected by suitably phasing coupling transformers, motor windings or other elements provided for correctly phasing the networks. Since transformer 31 reverses the phase of the voltage $\phi_2$, the output voltage from the potentiometer 28 will be of $-\phi_2$ phase. Hence when the quadrature component $+\phi_2$ and the correction voltage $-\phi_2$ are simultaneously impressed on junction point 33, the quadrature component will be effectively rejected, provided the magnitude of the correction voltage is almost equal to that of the quadrature component voltage. It will be understood that this equality is assured in practice by operation of the quadrature rejection loop at high gain.

The accuracy of operation of the quadrature rejection loop above described depends upon several factors. In general, the accuracy depends on the gain of the amplifier which, for this reason, should be designed to be relatively high. For example, the overall gain should preferably be such that a 10 milliwatt signal at the input of amplifier 7 may provide from 50 to 100 volts to drive servo-motor 8. Also there is a certain amount of gain in the servo-motor 13, as well as in potentiometer 28, which follows the step of detection or discrimination. It has been found desirable to damp the combination of servo-motor 13 and potentiometer 28, and hence it is advisable to immerse these two components in a suitable damping oil or other fluid. The system as described is especially suitable in connection with servo-mechanisms connected with computing or other apparatus which operates slowly, such, for example, as apparatus which controls aiming or sighting instruments on ships or aircraft.

Figure 3:
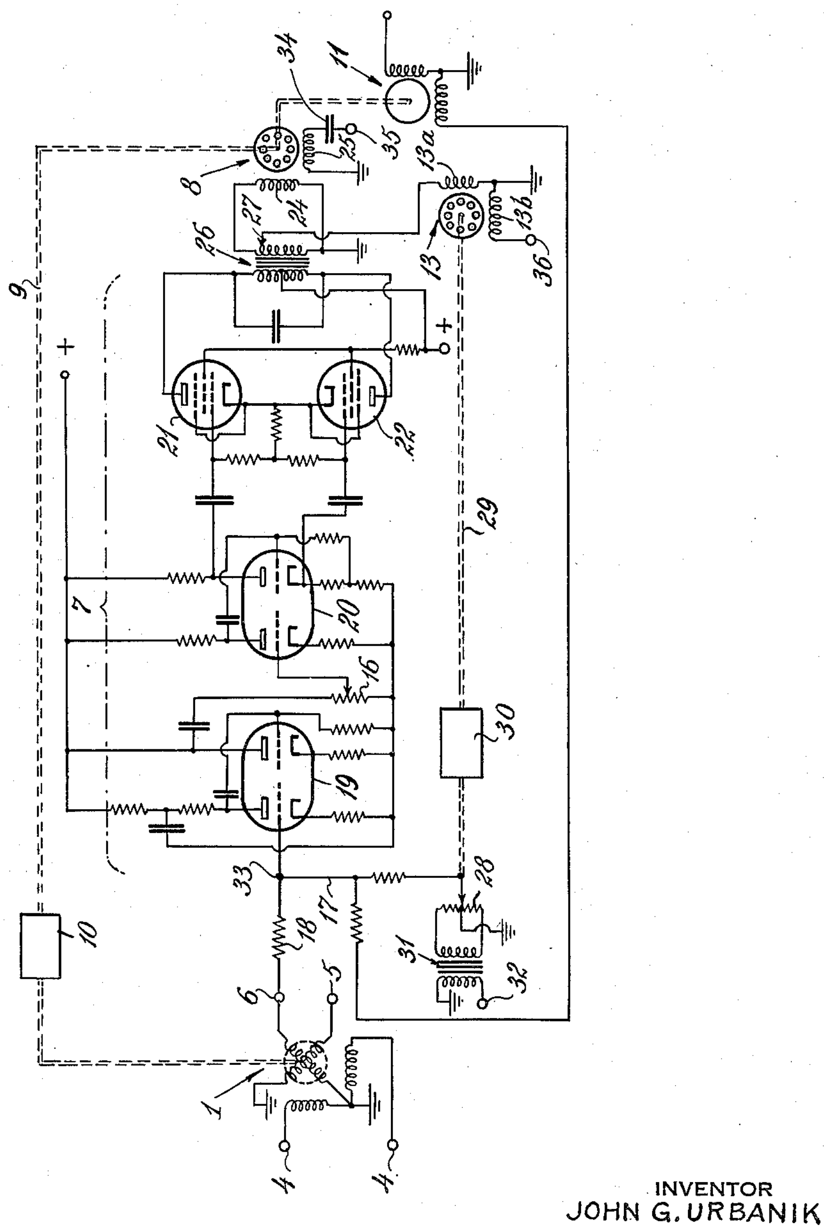
Fig. 3 is a circuit diagram of an alternative modification.

The modification of the invention illustrated in Fig. 3 is in most respects the same as that illustrated in Fig. 2. The principal difference in the system of Fig. 3 is the omission of the 90° phase-shift network 23 of Fig. 2. This omission requires a change in the phases of the reference voltages applied to servo-motors 8 and 13, respectively.

As before, the desired signal voltage may be indicated as of phase $\phi_1$ and the undesired quadrature component voltage as of phase $\phi_2$. Assuming that an independent source of reference voltage of phase $\phi_1$ is available, that source may be connected to terminal 35 which energizes winding 25, and also to terminal 36 which energizes the winding 13b. Inasmuch as it is the signal of phase $\phi_1$ which is intended to actuate servo-motor 8, it is then necessary to interpose a condenser 34 between winding 25 and terminal 35 to shift the phase of the applied voltage by 90°. Hence, in the arrangement as illustrated, it would be correct to say that, as shown, the winding 25 is energized by a voltage of phase $\phi_1$—90°. It would be preferable, however, to omit the condenser 34 and energize winding 25 directly by an independent source of phase $\phi_1$—90°, or the equivalent. In general, it is preferable not to attempt to shift the phase of the reference voltage by the use of a condenser, such as 34, because it is difficult to obtain a full 90° phase shift by this means. For this reason it is preferable to achieve the same end by shifting the phase of the signals in the amplifier, as illustrated in Figs. 2 and 4.

Since, as in the case of the arrangement of Fig. 2, the signal voltages applied to winding 13a of Fig. 3 can be said to be of phases $\phi_1$ and $\phi_2$, respectively, the induction motor 13 will respond to the quadrature component of phase $\phi_2$ if the winding 13b is energized from an independent voltage source of phase $\phi_1$, which is 90° displaced with respect to the component $\phi_2$.

As described in connection with the system of Fig. 2, an independent voltage of phase $\phi_2$ should be connected to terminal 32 of transformer 31 in order that a correction voltage of phase $-\phi_2$ be impressed at junction point 33 so as to reject the quadrature component.

Figure 4:
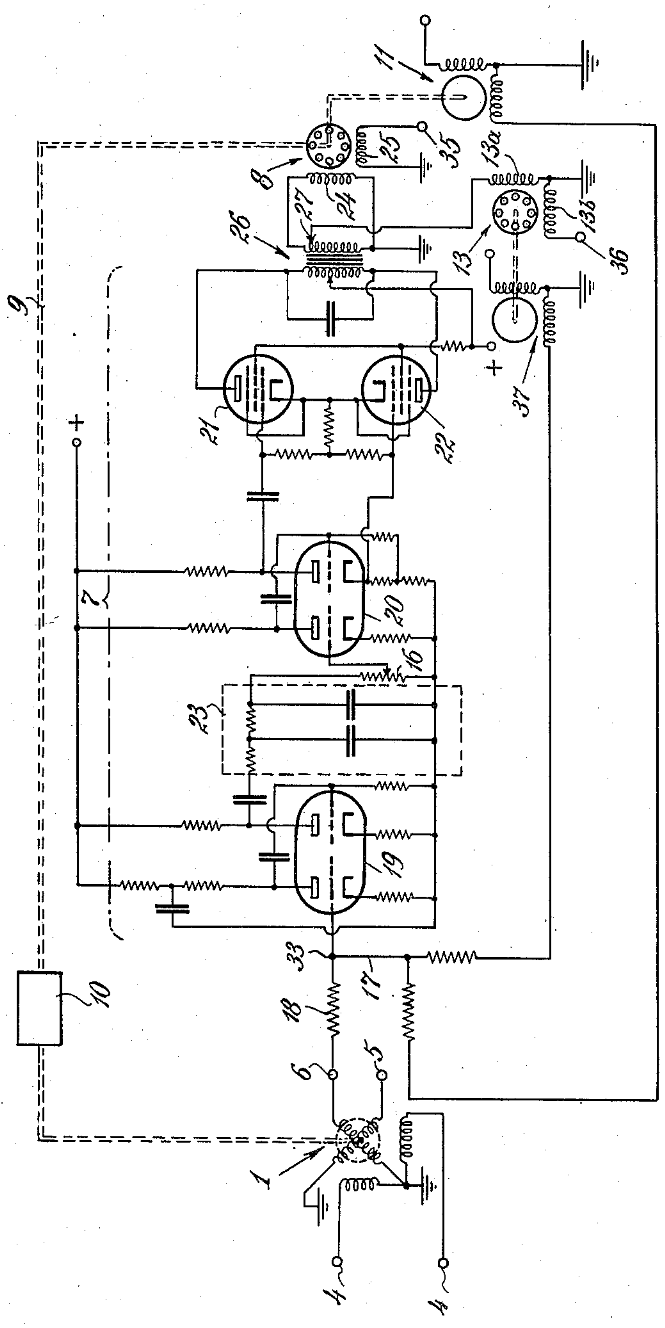
Fig. 4 is a circuit diagram of a system similar to that of Fig. 2, except for the means for producing the correction voltage.

The modification illustrated in Fig. 4 is identical with the system illustrated in Fig. 2, except as to the means by which the quadrature rejection or correction voltage is derived. In this case, as in that of Fig. 2 and Fig. 3, the quadrature phase servo-motor 13, which is a two-phase induction motor and is inherently a phase discriminator, is connected to tap 27 on the secondary of transformer 26 so that winding 13a is connected to receive voltage components of phases $\phi_1$ and $\phi_2$. As before, these are more accurately indicated as $\phi_1$—90° and $\phi_2$—90° in view of the presence of the phase-shift network 23 in the amplifier. However, inasmuch as winding 13b is energized from an independent voltage source of $\phi_1$—90° the motor 13 will respond only to voltage of phase $\phi_2$—90°.

It will be seen that in the embodiment of Fig. 4 the potentiometer with its power supply of Fig. 2 is omitted, and in place thereof a suitable tachometer or alternating-current generator 37 is substituted. A generator suitable for this application is known as the "drag-cup" type. It is not essential that the generator 37 be of the A. C. type because a suitable D. C. tachometer and remodulator could be substituted. However, the D. C. machine is subject to greater error because its residual magnetism must be overcome before its output can be reversed—which is not true of the A. C. type. The generator 37 is so designed and connected that its output voltage is of phase $-\phi_2$, and this output, which comprises the correction voltage, is connected as before at the junction point 33 on the input side of the amplifier tube 19. If the generator be designed so as to have substantially no quadrature voltage in its own output, the correction signal can never exceed the input signal and hence the quadrature rejection loop cannot overshoot or oscillate, and the system will be completely stable. In any case, since the quadrature voltage generator must actually rotate to generate the required correction voltage, an unusually high gain must be provided between that generator and the source of the undesired quadrature component voltage, to assure that the difference between the original quadrature component, and the correction component be small.

I claim:

1. In a servo-loop system comprising a resolver electrically coupled through an amplifier to a servo-motor which is mechanically coupled to said resolver, the method of eliminating the time quadrature distortion component of the electric signal from the output of the resolver appearing at the input of said amplifier which includes concurrently amplifying said signal and distortion component, separating said distortion component from said signal subsequent to said amplification, amplifying the separated distortion component, developing from said amplified distortion component a correction voltage of opposite sign and, at all instants, of magnitude substantially equal to that of the first-mentioned distortion component, and combining said correction voltage and said first-mentioned distortion component prior to said first-mentioned amplification.

2. The method of eleminating a time quadrature distortion component of an electric signal of carrier wave frequency which comprises amplifying the signal including said carrier and component, and shifting the phase thereof 90°, establishing an alternating reference voltage of a phase which is shifted 90° in the same direction as the first mentioned shift, electromagnetically combining the amplified distortion component and said reference voltage to comprise a two-phase field, translating said field into mechanical motion of which the displacement and direction are a measure of the magnitude of the distortion and of the discrete phase thereof, respectively, establishing from said motion an alternating current of potential proportional to said displacement and of phase corresponding to said direction, and introducing said alternating current potential in series opposition with said electric signal prior to amplifying the same.

3. The method of eliminating a time quadrature distortion component of an electric signal of carrier-wave frequency which comprises amplifying the signal including said carrier and component, establishing an alternating reference voltage which is in time phase with the signal, electromagnetically combining the amplified distortion component and said reference voltage to comprise a two-phase electromagnetic field, translating said field into mechanical motion of which the displacement and direction are a measure of the magnitude of the distortion and of the discrete phase thereof, respectively, establishing from said motion an alternating current of potential proportional to said displacement and of phase corresponding to said direction, and introducing said alternating-current potential in series opposition with said electric signal prior to amplifying the same.

4. In a servo-loop system comprising a resolver electrically coupled through an amplifier to a servo-motor which is mechanically coupled to said resolver, the method of eliminating the time quadrature distortion component of the electric signal from the output of the resolver appearing at the input of said amplifier which includes amplifying said signal and distortion component in said amplifier, impressing the amplified signal and distortion component on said servo-motor such that said motor responds only to the signal, translating the amplified distortion component into mechanical rotation of which the speed is proportional to the magnitude of said component, generating a correction voltage of amplitude proportional to said rate of rotation and of opposite sign to the distortion component, and combining said correction voltage and distortion component prior to said amplification.

5. In a servo-loop system, a resolver, a servo-motor which is mechanically coupled to said resolver to actuate the same in response to a desired electric signal component, and a circuit component electrically coupling the output of the resolver to the input of the servo-motor, means for eliminating the time quadrature voltage component of the electric signal from the output of the resolver appearing at the input of said component which includes time-phase-discriminating means connected to the output of said component and responsive only to said quadrature component voltage, a time-quadrature-correction voltage source having an output voltage which is controlled in response to the output of said phase-discriminating means such that said correction voltage is of substantially equal magnitude and of substantially opposite sign to that of said time quadrature component, and a circuit junction point at the input of said component on which said quadrature and correction voltages are simultaneously impressed.

6. In a servo-loop system, a resolver, a servo-motor which is mechanically coupled to said resolver to actuate the same in response to a desired electric signal component, and an amplifier electrically coupling the output of the resolver to the input of the servo-motor, means for eliminating the time quadrature voltage component of the electric signal from the output of the resolver appearing at the input of the amplifier which includes phase-discriminating means connected to the output of said amplifier and responsive only to said time quadrature component voltage, a time-quadrature-correction voltage source having an output voltage which is controlled in response to the output of said phase-discriminating means such that said correction voltage is of substantially equal magnitude and of substantially opposite sign to that of said quadrature component, and a circuit junction point at the input of said amplifier on which said quadrature and correction voltages are simultaneously impressed.

7. In a servo-loop system, a resolver, a servo-motor which is mechanically coupled to said resolver to actuate the same in response to a desired electric signal component, and an amplifier electrically coupling the output of the resolver to the input of the servo-motor, means for eliminating the time quadrature voltage component of the electric signal from the output of the resolver appearing at the input of the amplifier which includes phase-responsive means connected to the output of said amplifier for separating said time quadrature voltage component from said signal, a time-quadrature-correction voltage source coupled to the output of said phase-responsive means such as to generate a correction voltage of magnitude substantially equal and of opposite sign to that of said quadrature component, a circuit junction point at the input of said amplifier, and means combining said quadrature and correction voltages simultaneously at said point.

8. In a servo-loop system, a resolver, a servo-motor, shaft means mechanically coupling said servo-motor to said resolver to actuate the same in response to an electric signal, said signal having an undesired variable time quadrature voltage component, and an amplifier electrically coupling the output of the resolver to the input of the servo-motor, means for rejecting the variable time quadrature voltage component of the electric signal from the output of the resolver appearing at the input of the amplifier which includes a discriminator servo-motor of the two-phase type having one winding coupled to the output of the amplifier, a source of reference voltage of phase substantially 90 degrees displaced with respect to said quadrature component and of the same phase as that of said desired signal component, a second winding for said discriminator servo-motor connected to said source of reference voltage, a variable correction-voltage source actuated by said discriminator servo-motor and arranged to produce a correction voltage at all times of magnitude substantially equal and of phase substantially opposite to that of said time quadrature component, and a connection from said correction voltage source to the input of said amplifier, whereby said time quadrature component is rejected at the input side of said amplifier.

9. A system according to claim 8, in which said correction-voltage source comprises a potentiometer, and mechanical coupling means coupling said discriminator servo-motor to said potentiometer so as to drive the same, and a source of alternating-current voltage of a phase opposite to that of said quadrature component connected to energize said potentiometer.

10. A system according to claim 9, in which said potentiometer and said discriminator servo-motor are damped by being immersed in a damping fluid.

11. A system according to claim 10, in which said shaft means and said mechanical coupling means, each, includes gear reduction means, and said discriminator servo-motor and said potentiometer, as well as said amplifier having amplification characteristics, whereby to increase the accuracy of response of the time quadrature voltage rejection means.

12. In a servo-loop system, a resolver, a servo-motor, shaft means mechanically coupling said servo-motor to said resolver to actuate the same in response to a desired electric signal component, and an amplifier electrically coupling the output of the resolver to the input of the servo-motor, phase-shift means included in said amplifier for concurrently shifting by substantially 90 degrees the phase of said desired signal component and of said time quadrature voltage component, means for rejecting the time quadrature voltage component of the electric signal from the output of the resolver appearing at the input of the amplifier which includes a discriminator servo-motor of the two-phase type having one winding coupled to the output of the amplifier, a source of reference voltage of phase substantially 90 degrees displaced with respect to said quadrature component after subjection to said phase-shift means and of the same phase as that of said desired signal component after subjection to said phase-shift means, a second winding for said discriminator servo-motor connected to said source of reference voltage, a correction-voltage source actuated by said discriminator servo-motor and arranged to produce a correction voltage of magnitude substantially equal and of phase substantially opposite to that of said quadrature component, and a connection from said correction voltage source to the input of said amplifier, whereby said time quadrature component is rejected at the input side of said amplifier.

13. The method of eliminating the undesired time-quadrature distortion component of a desired electric signal appearing at a point in an electric control system which comprises concurrently amplifying said signal and said distortion component, separating said distortion component from said signal subsequent to said amplification, amplifying the separated distortion component, developing from said amplified distortion component a correction voltage of opposite sign and, at all instants, of magnitude slightly less than that of the first-mentioned distortion component, and combining said correction voltage and said first-mentioned distortion component at said point.

14. In a control system which includes a circuit element adapted to respond to an electric signal of carrier-wave frequency, means for eliminating the time-quadrature distortion component of said signal appearing at the output of said circuit element which comprises an amplifier coupled to the output of said circuit element and adapted to amplify the signal including said carrier and component, means coupled to the output of said amplifier for shifting the phase of said carrier and component substantially 90°, a source of alternating reference voltage of a phase which is shifted 90° in the same direction as the first-mentioned shift, means electromagnetically combining said reference voltage and said amplified distortion component, only, of said signal, to comprise a two-phase electromagnetic field, means translating said field into mechanical motion of which the displacement and direction are a measure of the magnitude of the distortion and of the discrete phase thereof, respectively, means establishing from said motion an alternating current of potential proportional to said displacement and of phase corresponding to said direction, and means connecting said alternating-current potential in series opposition with said electric signal at the input side of said amplifier.

15. In a control system which includes a circuit element adapted to respond to an electric signal of carrier-wave frequency, means for eliminating the time-quadrature distortion component of said signal appearing at the output of said circuit element which comprises an amplifier coupled to the output of said circuit element and adapted to amplify the signal including said carrier and component, a source of alternating reference voltage which is in time phase with the signal, means electromagnetically combining said amplified distortion component, only, of said signal, and said reference voltage to comprise a two-phase electromagnetic field, means translating said field into mechanical motion of which the displacement and direction are a measure of the magnitude of the distortion and of the discrete phase thereof, respectively, means establishing from said motion an alternating current of potential proportional to said displacement and of phase corresponding to said direction, and means connecting said alternating-current potential in series opposition with said electric signal at the input side of said amplifier.

16. In an electric control system including a circuit device having a movable member, said device producing an output signal comprising a desired signal component and an undesired time-quadrature voltage component which appears at a circuit junction point in said system following said circuit device, means for eliminating said undesired component without affecting the desired signal component which comprises a servo-motor which is mechanically coupled to said movable member to actuate the same in response to the desired component of said signal, circuit means electrically coupling the output of said device to the input of the servo-motor, means for eliminating the time-quadrature voltage component of said electric signal appearing at the input side of said circuit means, which includes, time-phase-discriminating means connected to the output side of said circuit means and responsive only to said quadrature component voltage, a time-quadrature correction-voltage source having an output voltage which is continuously controlled in response to the output of said phase-discriminating means such that said correction voltage is of substantially equal magnitude and of substantially opposite sign to that of said time-quadrature component, a circuit junction point at the input side of said circuit means, and means for impressing said correction voltage on said junction point in phase substantially opposite to and in magnitude substantially equal to said quadrature voltage at said point.

17. In a servo-loop system, a circuit device having a movable member of which the electrical output comprises a signal having an undesired time-quadrature component and a desired signal component, a servo-motor which is mechanically coupled to said movable member to actuate the same in response to said desired electrical signal component, and an amplifier electrically coupling the output of said device to the input of the servo-motor, means for eliminating the undesired component appearing at the input of the amplifier, and without affecting the desired signal component, which includes phase-discriminating means connected to the output of said amplifier and responsive only to said time-quadrature voltage component, a time-quadrature correction voltage source having an output voltage which is continuously controlled in response to the output of said phase-discriminating means such that said correction voltage is of substantially equal magnitude and of substantially opposite sign to that of said quadrature component, a circuit junction point at the input of said amplifier, and means combining said quadrature and correction voltage simultaneously at said point.

JOHN G. URBANIK.

References Cited in the file of this patent

UNITED STATES PATENTS

| Number | Name | Date |
| --- | --- | --- |
| 2,440,200 | Jofeh | Apr. 20, 1948 |
| 2,452,564 | Goldstein | Nov. 2, 1948 |
| 2,465,624 | Agins | Mar. 29, 1949 |
| 2,525,636 | Bedford et al. | Oct. 10, 1950 |
| 2,544,921 | Greenough | Mar. 13, 1951 |